United States Patent
Kar et al.

(10) Patent No.: US 10,484,413 B2
(45) Date of Patent: Nov. 19, 2019

(54) SYSTEM AND A METHOD FOR DETECTING ANOMALOUS ACTIVITIES IN A BLOCKCHAIN NETWORK

(71) Applicant: Cognizant Technology Solutions India Pvt. Ltd., Chennai (IN)

(72) Inventors: Abhishek Kar, Kolkata (IN); Arpit Jain, Kota (IN); Kuntal Das, Burdwan (IN); Shyam Kumar, Patna (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 212 days.

(21) Appl. No.: 15/798,661

(22) Filed: Oct. 31, 2017

(65) Prior Publication Data
US 2019/0058719 A1    Feb. 21, 2019

(30) Foreign Application Priority Data
Aug. 21, 2017    (IN) .............................. 201741029567

(51) Int. Cl.
*G06F 21/00*    (2013.01)
*H04L 29/06*    (2006.01)

(52) U.S. Cl.
CPC ...... *H04L 63/1425* (2013.01); *H04L 63/1416* (2013.01)

(58) Field of Classification Search
CPC ................................................. H04L 63/1425
See application file for complete search history.

(56) References Cited

U.S. PATENT DOCUMENTS

| 8,041,597 B2 * | 10/2011 | Li ....................... G06Q 10/063 705/7.38 |
| 8,516,584 B2 * | 8/2013 | Moskovitch ......... G06F 21/566 726/23 |
| 10,311,230 B2 * | 6/2019 | Jagadeesan ........... G06F 21/552 |

(Continued)

OTHER PUBLICATIONS

Monamo, Patrick, Vukosi Marivate, and Bheki Twala. "Unsupervised learning for robust Bitcoin fraud detection." 2016 Information Security for South Africa (ISSA). IEEE, 2016.*

(Continued)

*Primary Examiner* — Harris C Wang
(74) *Attorney, Agent, or Firm* — Cantor Colburn LLP

(57) ABSTRACT

A system and a method for detecting anomalous activities in a distributed and decentralised network is provided. Anonymous users transacting in the network are identified and one or more transactional attributes are retrieved to define characteristics of users and associated transactional behaviour with other users. Further, user-level statistics are evaluated based on transactional attributes. Datatype representative of transactional behavior of users with other users is generated using user-level statistics of identified users. Users with similar transactional behavior are classified based on generated transactional attributes. One or more anomaly detection techniques are implemented for identifying optimum classification of users into data clusters based on the change detected in the classification of users in data clusters. Anomalous users are identified from the optimum classification for efficiently and effectively detecting anomalous activities in the network.

20 Claims, 11 Drawing Sheets

(56) References Cited

U.S. PATENT DOCUMENTS

| | | | | |
|---|---|---|---|---|
| 2016/0071108 A1* | 3/2016 | Caldera | ............. | G06Q 20/4016 |
| | | | | 705/75 |
| 2016/0342994 A1* | 11/2016 | Davis | ................... | G06Q 20/027 |
| 2017/0011091 A1* | 1/2017 | Chehreghani | ........... | G06F 16/22 |
| 2018/0144378 A1* | 5/2018 | Perez | .................... | G06Q 30/06 |
| 2018/0337769 A1* | 11/2018 | Gleichauf | ............. | H04L 9/3239 |
| 2019/0058719 A1* | 2/2019 | Kar | .................... | H04L 63/1425 |
| 2019/0156026 A1* | 5/2019 | Liao | ...................... | G06F 21/552 |

OTHER PUBLICATIONS

Pham, Thai, and Steven Lee. "Anomaly detection in bitcoin network using unsupervised learning methods." arXiv preprint arXiv: 1611.03941 (2016).APA.*

Manish Gupta, "Community Distribution Outlier Detection in Heterogeneous Information Networks", 2014.

Sanjay Chawla, "k-means—: A unified approach to clustering and outlier detection", 2015.

Surbhi Agarwal, "A Fast Fraud Detection Approach Using Clustering Based Method", Journal of Basic and Applied Engineering Research, vol. 1, No. 10, Oct. 2014, pp. 33-37.

* cited by examiner

| Timestamp | transaction_index | Source_address | input_value | Destination_address | Output_value | Output_spent |
|---|---|---|---|---|---|---|
| 1330584035 | 3039435 | 1Lijr4mXiYcXAdFC2xWfLrWi5Lobg8xJML | 205743000 | | | |
| 1330584035 | 3039435 | | | 1rFr11ogwb12LmWnyn7bCgzNfYvcfbMMJ | 205700000 | TRUE |
| 1330584068 | 3039434 | 1EoGSzk83VDHoGr9ohsqJ3Jt7mbhxoqaRv | 3.0017E+11 | | | |
| 1330584068 | 3039434 | 1Lijr4mXiYcXAdFC2xWfLrWi5Lobg8xJML | 2057432 | | | |
| 1330584068 | 3039434 | | | 17ZAES87rof9oQDUpSvPFs6Pn4Ns3DVQis | 1002773 | TRUE |
| 1330584068 | 3039434 | | | 1EG6A5jv3waPWb4bR4EGmx7DarYyXE2PFW | 3E+11 | TRUE |
| 1330584146 | 3039438 | 1BCkEn6S5Hc97bzgMzLDp4A7evlWEZpKUY | 2.00154E+11 | | | |
| 1330584146 | 3039438 | | | 19TvMBef3sCghwxwEfE1aRAjHj5LSWicB9 | 1000000 | TRUE |
| 1330584146 | 3039438 | | | 1Lijr4mXiYcXAdFC2xWfLrWi5Lobg8xJML | 2E+11 | TRUE |

FIG. 2a

|  | Total Sent | Total Received | Highest Received | Highest Sent | Received Transactions | Sent Transactions |
|---|---|---|---|---|---|---|
| User 1 | 60 | 10 | 5 | 12 | 3 | 9 |
| User 2 | 32 | 24 | 15 | 2 | 17 | 8 |
| User 3 | 23 | 80 | 9 | 5 | 21 | 12 |

FIG. 3

|        | User 1 | User 2 | User 3 |
|--------|--------|--------|--------|
| User 1 |        | 2      | 7      |
| User 2 | 2      |        | 11     |
| User 3 | 7      | 11     |        |

FIG. 4

| PE Value | Data Cluster | User | Node Component | Link Component |
|---|---|---|---|---|
| 5.484 | 1 | 1 | 5.484 | 0 |
| 18.790 | 2 | 1 | 18.790 | 0 |
| 24.814 | 4 | 1 | 24.814 | 0 |
| 4.995 | 1 | 2 | 4.995 | 0 |
| 18.223 | 2 | 2 | 18.223 | 0 |
| 24.247 | 4 | 2 | 24.247 | 0 |
| 3.316 | 1 | 4 | 3.3167 | 0 |
| 13.617 | 2 | 4 | 13.617 | 0 |
| 19.642 | 4 | 4 | 19.642 | 0 |

FIG. 5

| PE Value | Data Cluster | User | Node Component | Link Component |
|---|---|---|---|---|
| 5.484 | 1 | 1 | 5.484 | 0 |
| 4.995 | 1 | 2 | 4.995 | 0 |
| 3.674 | 1 | 265 | 3.374 | 0.3 |
| 3.516 | 1 | 9 | 3.316 | 0.2 |
| 3.316 | 1 | 7 | 3.316 | 0 |

FIG. 6

Circles — Users
Triangles — Outliers
Arrows — Transactions

SYSTEM AND A METHOD FOR DETECTING ANOMALOUS ACTIVITIES IN A BLOCKCHAIN NETWORK

FIELD OF THE INVENTION

The present invention relates generally to the field of data mining and analysis. More particularly, the present invention relates to a system and a method to effectively detect anomalous activities in a distributed and decentralized network which offers user anonymity.

BACKGROUND OF THE INVENTION

Blockchain is a distributed electronic ledger that records transactions between source address (es) and destination address (es) and may be implemented in various fields. Blockchain is representative of a data structure that stores a list of transactions. The transactions are bundled into blocks and every block except for the first block is linked to a prior block in the chain. A blockchain is typically managed by a peer-to-peer network collectively adhering to a protocol for validating new blocks and the transactions contained in the corresponding block. One of the implementation of blockchain is in digital currency (bitcoin).

The integrity of the entire blockchain is maintained because each block refers to or includes a cryptographic hash value of the prior block. Accordingly, even a small modification to the data will affect the hash value of the entire block. Therefore, once a block refers to a prior block, it becomes difficult to modify or tamper with the data (e.g., the transactions) contained therein. Each additional block increases the difficulty of tampering with the contents of an earlier block. Thus, even though the contents of a blockchain may be available for all to see, they become practically immutable.

The addresses used for blockchain transactions are created through cryptography such as, for example, public key cryptography. For instance, a user may create a destination address based on a private key. The relationship between the private key and the destination address can later be used to provide "proof" that the user is associated with the output from that created transaction. In other words, the user can now create another transaction to "use" the contents of the prior transaction. Further, as the relationship between the destination address and the corresponding private key is only known by the user, the user has some amount of anonymity as they can create many different destination addresses (which are only linked through the private key). Accordingly, a user's total association with multiple transactions included in the blockchain may be hidden from other users. While the details of a transaction may be publically available on the distributed ledger, the underlying participants to those transactions may be hidden because the addresses are linked to private keys known only to the corresponding participants.

While blockchain technology has the potential to offer new benefits, it also poses problems for certain types of implementations. For instance, a decentralized and anonymous transaction ledger can be problematic for certain types of environments that desire or require transparency and/or auditability for the transactions. There are no names or personal information associated with a user during a transaction and therefore, it becomes difficult to fetch user-level statistics and link blockchain addresses (for e.g. Bitcoin addresses) to them. Furthermore, there may be multiple source and destination addresses for each transaction and multiple addresses may belong to a single user. Therefore, the feature of user anonymity makes it a lucrative target for anomalous activities such as money laundering and illegal activities such as terrorist activity financing offence. Further, this also accounts for the reluctance of large financial players to make blockchain a major part of their future. Due to the nature of financial services, detecting and preventing financial crime is becoming intricate.

Further, some of the existing techniques of identifying anomalous activities in a blockchain network, use cluster analysis, wherein the transactions are clustered based on one or more user attributes. In these techniques the transactions that vary from normal transactional behavior are identified based on user level data. However, for efficient and accurate detection of anomalous activities, it is observed that user level data as well as associated behavior with other users must be taken into account. Compliance professionals are thus looking for better and more cost-effective strategies.

In light of the above drawbacks, there is a need for a system and a method which effectively detects anomalous activities (user behavior, events and transactions) in a distributed and decentralised network which offers user anonymity, such as, a blockchain network. There is a need for a system and a method which uses a dynamic and proactive approach for monitoring anomalous activities, taking into consideration statistics of users individually as well as associated transaction behavior with other users on the blockchain network. Further, there is a need for a system and a method which is capable of analyzing transaction data extracted from a block chain network in real time and detect anomalous activities. Yet further, there is a need for a system and a method which can be easily implemented with existing distributed and decentralized networks such as public and private blockchain networks. Yet further, there is also a need for a system and a method which is cost effective and provides superior performance.

SUMMARY OF THE INVENTION

A method for detecting anomalous activities in a distributed and decentralized network is provided. In various embodiments of the present invention, the method is performed by an anomaly detection engine interfacing with one or more transaction databases and one or more terminal devices. The anomaly detection engine executes instructions stored in a memory via a processor. The method comprises generating, by the anomaly detection engine, a data set representative of identified users and associated transactional behavior. The users are identified from anonymous users transacting in the distributed and decentralized network using a first set of rules. The method further comprises generating, by the anomaly detection engine, a datatype by processing the data set using a second set of rules. The datatype is representative of transactional behavior of the users with other users. Furthermore, the method comprises generating, by the anomaly detection engine, one or more first level data clusters based on the data set and one or more transactional attributes by employing one or more clustering techniques. Each data cluster is representative of data associated with users having similar transactional behaviour. The method further comprises generating, by the anomaly detection engine, anomaly detection values based on the first level data clusters, the datatype and one or more behavioral parameters derived from the first level data clusters by employing an anomaly detection technique. Furthermore, the method comprises classifying users, by the anomaly detection engine, into one or more second level data clusters based on the generated anomaly detection values using a third set of rules. The second level data clusters are representative of data associated with users having similar transactional behavior. The method further comprises, classifying users, by the anomaly detection engine, into one or more new data clusters based on the generated anomaly detection values using a third set of rules. The new data clusters are representative of data associated with users having similar transactional behavior. Yet further, the method comprises determining, by the anomaly detection engine, if the classification of users into the new data clusters is same as the classification of users into the second level data clusters. The classification of users is identified as optimum classification if the classification remains the same. Finally, the method comprises, identifying one or more users with high anomaly detection value from the users classified in the new data cluster classification determined as optimum classification. The one or more users with high anomaly detection values are identified as anomalous users.

A system for detecting anomalous activities in a distributed and decentralized network is provided. In various embodiments of the present invention, the system interfaces with one or more transaction databases and one or more terminal devices. The system comprises a memory storing program instructions, a processor configured to execute program instructions stored in the memory, and an anomaly detection engine in communication with the processor. The anomaly detection engine configured to generate a data set representative of identified users and associated transactional behavior. The users are identified from anonymous users transacting in the distributed and decentralized network using a first set of rules. The anomaly detection engine generates a datatype by processing the data set using a second set of rules. The datatype is representative of transactional behavior of the users with other users. Further, the anomaly detection engine generates one or more first level data clusters based on the data set and one or more transactional attributes by employing one or more clustering techniques. Each data cluster is representative of data associated with users having similar transactional behaviour. Furthermore, the anomaly detection engine generates anomaly detection values based on the first level data clusters, the datatype and one or more behavioral parameters derived from the first level data clusters by employing an anomaly detection technique. The anomaly detection engine, further classifies users into one or more second level data clusters based on the generated anomaly detection values using a third set of rules. The second level data clusters are representative of data associated with users having similar transactional behavior.

Furthermore, the anomaly detection engine, classifies users into one or more new data clusters based on the generated anomaly detection values using a third set of rules. The new data clusters are representative of data associated with users having similar transactional behavior. Yet further, the anomaly detection engine determines if the classification of users into the new data clusters is same as the classification of users into the second level data clusters. The classification of users is identified as optimum classification if the classification remains the same. Finally, the anomaly detection engine, identifies one or more users with high anomaly detection value from the users classified in the new data cluster classification determined as optimum classification, wherein the one or more users with high anomaly detection values are identified as anomalous users.

A computer program product is provided. The computer program product comprises a non-transitory computer-readable medium having computer-readable program code stored thereon, the computer-readable program code comprising instructions that, when executed by a processor, cause the processor to generate a data set representative of identified users and associated transactional behavior. The users are identified from anonymous users transacting in the distributed and decentralized network using a first set of rules. Further, a datatype is generated by processing the data set using a second set of rules. The datatype is representative of transactional behavior of the users with other users. Furthermore, one or more first level data clusters are generated based on the data set and one or more transactional attributes by employing one or more clustering techniques. Each data cluster is representative of data associated with users having similar transactional behaviour. Furthermore, anomaly detection values based on the first level data clusters are generated, the datatype and one or more behavioral parameters derived from the first level data clusters by employing an anomaly detection technique. Further, users are classified into one or more second level data clusters based on the generated anomaly detection values using a third set of rules. The second level data clusters are representative of data associated with users having similar transactional behavior.

Furthermore, users are classified into one or more new data clusters based on the generated anomaly detection values using a third set of rules. The new data clusters are representative of data associated with users having similar transactional behavior. Yet further, it is determined if the classification of users into the new data clusters is same as the classification of users into the second level data clusters. The classification of users is identified as optimum classification if the classification remains the same. Finally, one or more users with high anomaly detection value are identified from the users classified in the new data cluster classification determined as optimum classification. The one or more users with high anomaly detection values are identified as anomalous users.

BRIEF DESCRIPTION OF THE ACCOMPANYING DRAWINGS

The present invention is described by way of embodiments illustrated in the accompanying drawings wherein:

FIG. 2a is an exemplary table comprising source and destination addresses transacting in a bitcoin network;

FIG. 3 is an exemplary table depicting a dataset generated by using a list of identified users and associated transactional information based on the retrieved transactional attributes, in accordance with an exemplary embodiment of the present invention;

FIG. 4 shows an example of a datatype i.e. an adjacency matrix generated from the dataset as illustrated in FIG. 3, in accordance with an exemplary embodiment of the present invention;

FIG. 5 is an exemplary table depicting an example of anomaly detection values (posterior energy values) generated by anomaly detection technique, in accordance with an exemplary embodiment of the present invention;

FIG. 6 is an exemplary table depicting an example of classification of users into data cluster based on the anomaly detection values (posterior energy values), in accordance with an exemplary embodiment of the present invention.

DETAILED DESCRIPTION OF THE INVENTION

The present invention discloses a system and a method for detecting anomalous activities in a distributed and decentralised network which offers user anonymity, such as, a blockchain network. The system and method of the present invention analyses statistics of a user individually as well as the user's transactional behavior with other users on the network. In particular, the present invention provides for identifying anonymous users participating in one or more transactions and retrieving one or more transactional attributes to define characteristics of a user and associated transactional behaviour with other users. The user-level statistics of the identified users are thereafter evaluated with the help of transactional attributes. A datatype representative of transactional behavior of the users with other users is generated using the user-level statistics of the identified users. Yet further, the system and method provides for grouping of users with similar transactional behavior by applying one or more clustering techniques based on generated transactional attributes, and further implements one or more anomaly detection techniques for efficiently detecting anomalous activities in the network.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
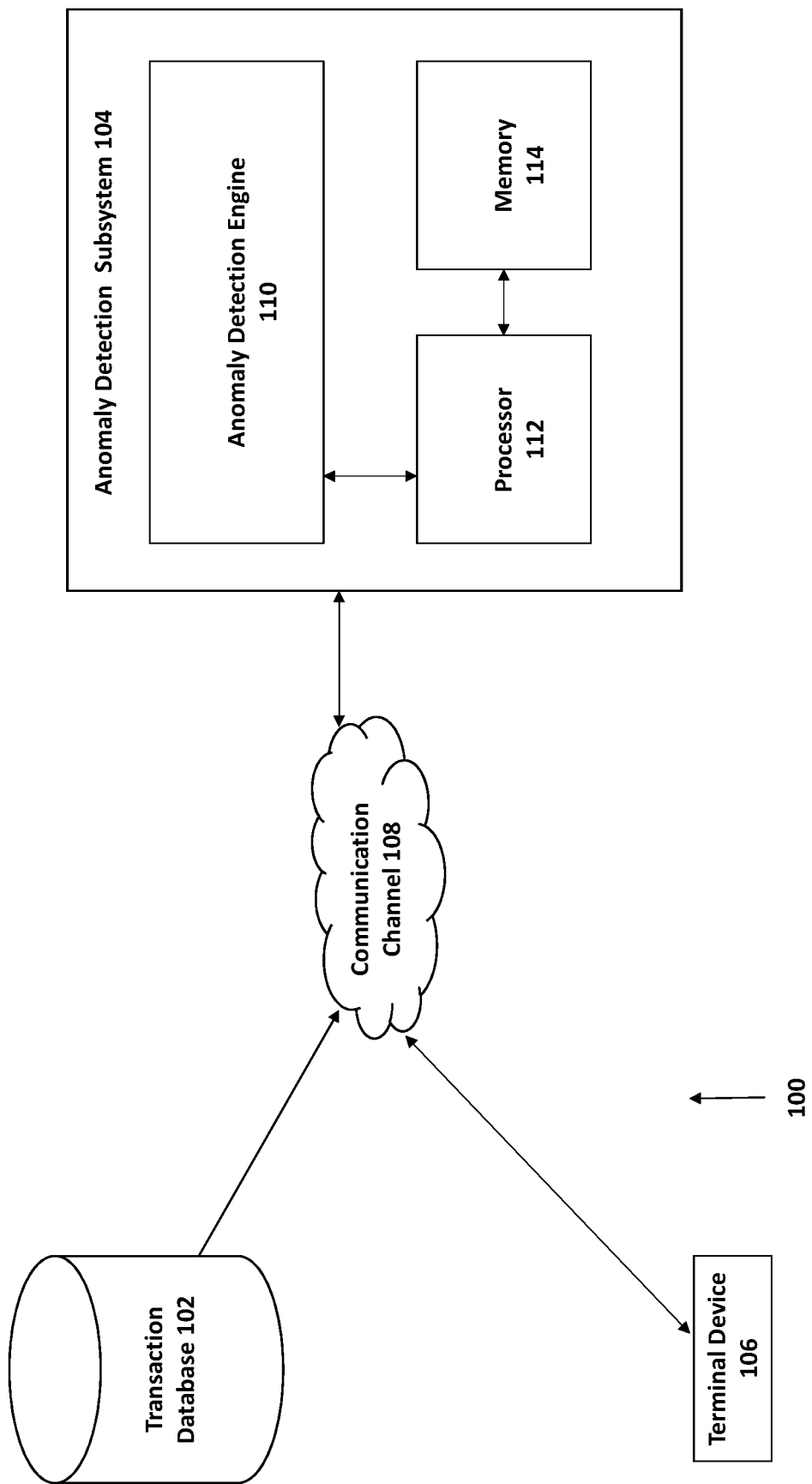
FIG. 1 illustrates a block diagram of a system for detecting anomalous activities in a distributed and decentralized network which offers user anonymity, in accordance with various embodiments of the present invention.

FIG. 1 illustrates a block diagram of a system for detecting anomalous activities in a distributed and decentralized network which offers user anonymity, in accordance with various embodiments of the present invention. Referring to FIG. 1, in an embodiment of the present invention, the system 100 comprises a transaction database 102, an anomaly detection subsystem 104 and a terminal device 106.

In various embodiments of the present invention, the transaction database 102 may be a storage server which is remote to the anomaly detection subsystem 104. The transaction database 102 may store a record of transactions which occur in decentralized and distributed network which offers user anonymity. In an embodiment of the present invention, the transaction database 102 may be updated with new blocks including new transactions in real-time. In an embodiment of the present invention, the transaction database 102 comprises records of transactions occurring in a blockchain network such as a bitcoin network. In exemplary embodiment of the present invention the transaction database 102 may be accessed through a web address by the anomaly detection subsystem 104.

In various embodiments of the present invention, the terminal device 106 may include but is not limited to a smart phone, a computer, a tablet, microcomputer or any other wired or wireless processing device. In an exemplary embodiment of the present invention the terminal device 106 may be configured with a user interface (not shown) of the anomaly detection subsystem 104 to facilitate the selection of transactional data to be analyzed, retrieval of the analyzed data, fetching detailed reports of the anomalous activities etc. by a user. The user-interface (not shown) may be customized as per the user of the system 100.

In an exemplary embodiment of the present invention, as shown in FIG. 1, the anomaly detection subsystem 104 interfaces with the transaction database 102 and the terminal device 106 over a communication channel 108. The anomaly detection subsystem 104 receives transactional data associated with one or more transactions in a distributed and decentralized network from the transaction database 102. The anomaly detection subsystem 104 analyses the received transactional data and outputs the results to the terminal device 106. It may be understood that the present invention is not limited to the number of transaction databases 102 and the number of terminal devices 106 with which the anomaly detection subsystem 104 interfaces. Further, the communication channel 108 may include a physical transmission medium, such as, a wire, or a logical connection over a multiplexed medium, such as, a radio channel in telecommunications and computer networking. The examples of radio channel in telecommunications and computer networking may include a Local Area Network (LAN), a Metropolitan Area Network (MAN), and a Wide Area Network (WAN).

Further, the anomaly detection subsystem 104 comprises an anomaly detection engine 110, a processor 112 and a memory 114. The anomaly detection engine 110 is a self-learning engine configured to automatically analyze complex transactional data, extract transaction addresses, identify users of the transaction addresses, generate computable datasets, datatypes and data clusters, and detect anomalous activities by applying anomaly detection techniques on said generated data. Examples of anomalous activities may include transaction related to money laundering offence, a terrorist activity financing offence, a high value transaction, a high volume transaction, a locked in transaction, and distribution of large amount into different addresses of a single user through small transactions. The detected anomalous activities may be stored and maintained in the memory 114 or some external storage (not shown) for future use by the anomaly detection engine 110, which in turn provides speed, precision and superior performance in detection of anomalous activities in future.

In various embodiments of the present invention, the anomaly detection engine 110 is configured to retrieve transactional data from the transaction database 102. Said transactional data obtained from the transaction database 102 may include information pertaining to one or more previously occurred transactions between one or more users. In particular, said transactional data includes transaction details such as source addresses, destination addresses, transaction time stamps, address data, transaction input value, transaction output value data, transaction fee etc. In an exemplary embodiment of the present invention, the transactional data may be associated with previously occurred transactions of a bitcoin network. Said transactional data may include details of transactions between multiple source and destination addresses, number of bitcoins sent from one address to another, number of bitcoins received by a destination address, time stamps of corresponding transactions, bitcoin balance of an address, block height etc.

Further, the anomaly detection engine 110 analyses the transactional data retrieved from the transaction database 102 and identifies anonymous users participating in one or more transactions from said transactional data by applying a first set of rules. In an embodiment of the present invention, the anonymous users are identified by linking multiple source and destination addresses that are unique to a particular user.

The anomaly detection engine 110 is further configured to retrieve one or more predetermined transactional attributes from the memory 114. The transactional attributes are selected so as to define characteristics of a user and associated transactional behaviour with other users. In an exemplary embodiment of the present invention, transactional attributes may include but are not limited to total bitcoin sent, total bitcoin received, highest bitcoins sent, highest bitcoins received, number of transactions as a sender and number of transactions as a receiver.

The anomaly detection engine 110 further evaluates user-level statistics of the identified users by using the transactional data received from the transaction database 102. In particular, the anomaly detection engine 110 generates a data set representative of identified users and associated transactional behavior based on the generated transactional attributes. The generated data set is further processed by the anomaly detection engine 110 using a second set of rules to generate a data type. The generated datatype is representative of transactional behavior of a user with other users. Said datatype is further used by the anomaly detection engine 110 to calculate similarity index for identified users transacting in one or more transactions of the transactional data received from the transaction database 102. The term similarity index as used in the specification is evaluated based on the number of transactions between a unique user with another unique user in the network. More the number of transactions between any two unique users, higher is the similarity index between them. The anomaly detection engine 110 further analyses the generated data sets and datatype and groups the identified users with similar transactional behavior into one or more first level data clusters. In particular, the anomaly detection engine may apply one or more clustering techniques such as k-means clustering technique to form first level data clusters of the identified users based on the generated transactional attributes. Each first level data cluster is representative of identified users with similar transactional history.

The anomaly detection engine 110 further derives one or more behavioural parameters from said first level data clusters. Further the anomaly detection engine 110 implements generated datatype, first level data clusters and one or more behavioural parameters into an anomaly detection technique for efficiently detecting anomalous activities in the network. In an exemplary embodiment of the present invention, the anomaly detection technique is a community outlier detection method based on Hidden Markov Random Field model. The anomaly detection technique provides for evaluation of anomaly detection values referred to as posterior energy (PE) values for each identified user, based on its transactional history and behavior with other identified users. The anomaly detection value (posterior energy value) is the parameter which represents anomalous activities. The users with high anomaly value are considered as outliers or users involved in anomalous activities. The evaluation of anomaly detection value and categorising of users as anomalous users is explained in detail in the following description. It may be understood from the above embodiments that the present invention may be implemented on any distributed and decentralized network which offers user anonymity.

In various embodiments of the present invention, the anomaly detection engine 110 has multiple units which work in conjunction with each other to analyze the transactional data associated with one or more transactions in a distributed and decentralized network and detect anomalous activities. The various units of the anomaly detection engine 110 are operated via the processor 112 specifically programmed to execute instructions stored in the memory 114 for executing respective functionalities of the units of the subsystem 104 in accordance with various embodiments of the present invention.

In another embodiment of the present invention, the anomaly detection subsystem 104 may be implemented in a cloud computing architecture in which data, applications, services, and other resources are stored and delivered through shared data-centers. In an exemplary embodiment of the present invention, the functionalities of the anomaly detection subsystem 104 are delivered to the terminal device 106 as software as a service (SAAS) over the communication network 108.

In another embodiment of the present invention, the anomaly detection subsystem 104 may be implemented as a client-server architecture, wherein the terminal device 106 is connected with transaction database 102. The terminal device 106 accesses a server hosting the subsystem 104 over a communication network 108.

In yet another embodiment of the present invention the anomaly detection subsystem 104 may be accessed through a web address via the terminal device 106. The transactional data may be received by the anomaly detection subsystem 104 from the transaction database 102.

Figure 2:
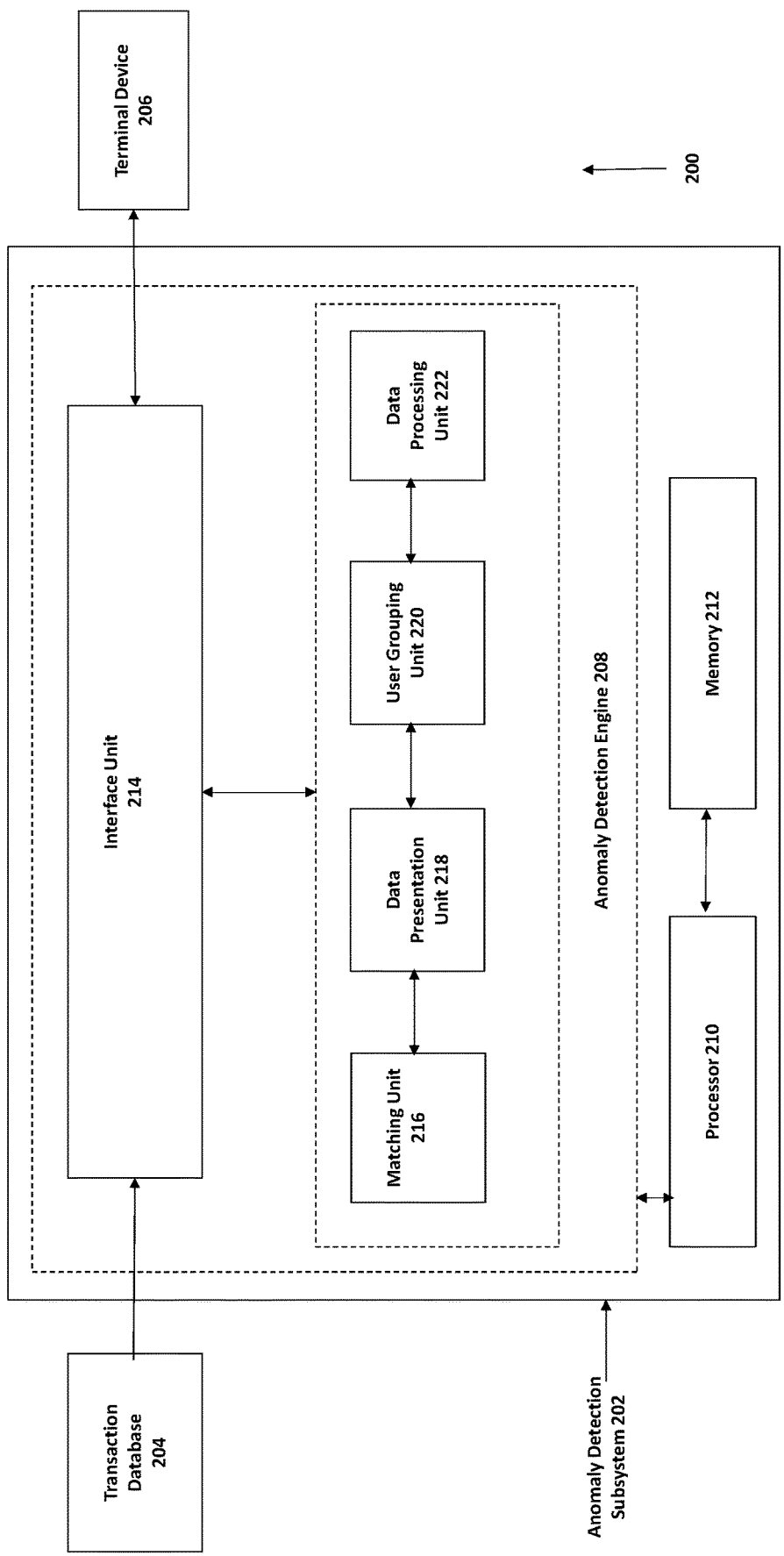
FIG. 2 is a detailed block diagram of an anomaly detection subsystem for analyzing transactional data of a distributed and decentralized network to detect anomalous activities, in accordance with various embodiments of the present invention.

FIG. 2 is a detailed block diagram of an anomaly detection subsystem for analyzing transactional data of a distributed and decentralized network to detect anomalous activities, in accordance with various embodiments of the present invention. The anomaly detection subsystem 202 interfaces with the transaction database 204 to receive transactional data associated with one or more transactions in a distributed and decentralized network. Further, the anomaly detection subsystem 202 interfaces with a terminal device 206 to transmit the analyzed data representative of anomalous activities. The anomaly detection subsystem 202 comprises an anomaly detection engine 208, a processor 210 and a memory 212.

In an embodiment of the present invention, the anomaly detection engine 208 comprises an interface unit 214, a matching unit 216, a data presentation unit 218, a user grouping unit 220 and a data processing unit 222.

The interface unit 214 is configured to interact with the transaction database 204 and the terminal device 206. The interface unit 214 retrieves transactional data associated with one or more transactions in a distributed and decentralized network from the transaction database 204. The transactional data obtained from the transaction database 204 include information pertaining to one or more previously occurred transactions between one or more users. In particular, said transactional data includes transaction details such as source addresses, destination addresses, transaction time stamps, address data, transaction input value, transaction output value data, transaction fee etc. In an exemplary embodiment of the present invention, the transactional data may be associated with previously occurred transactions of a bitcoin network. Said transactional data may include details of transactions between multiple source and destination addresses, number of bitcoins sent from one address to another, number of bitcoins received by a destination address, time stamps of corresponding transactions, bitcoin balance of an address, block height etc. Said transactional data is analyzed by the other units of the anomaly detection engine 208 i.e. the matching unit 216, the presentation unit 218, the user grouping unit 220 and the data processing unit 222. The interface unit 214 further transmits the analyzed data as an output to the terminal device 206.

In an embodiment of the present invention, the matching unit 216 is configured to receive the transactional data from the interface unit 214. The matching unit 216 analyses the transactional data received from the transaction database 204 and identifies anonymous users participating in one or more transactions from said received transactional data by applying a first set of rules. In an exemplary embodiment of the present invention, the anonymous users are identified in the manner as discussed herein below. The matching unit 216 links each unique source address associated with a single transaction to a user. The matching unit 216 searches for each unique source address in all the received transactions. The matching unit 216 links other source addresses that are associated with the unique source address in one or more transactions with the user of respective source address. The matching unit 216, further searches for each unique source address in the destination addresses of the received transactions. The matching unit 216 analyses received transactions for change addresses associated with destination addresses that are same as unique source addresses. Further, the matching unit 216 links the change addresses to the user of the respective source addresses. In an exemplary embodiment of the present invention, the change address is representative of a new address or any previously used address generated in a transaction in order to receive remaining data from a source address which is different from the destination address. An exemplary table comprising source and destination addresses transacting in a bitcoin network has been shown in FIG. 2a. In an exemplary embodiment of the present invention the matching unit 216 identifies the anonymous users by using the exemplary table as shown in FIG. 2a. The matching unit 216 links each unique source address associated with a single transaction to a user. For example: the matching unit 216 links the unique source address 1Lijr4mXiYcXAdFC2xWfLrWi5Lobg8xJML of transaction 3039435 to a user. The matching unit 216 searches for the unique source address 1Lijr4mXiYcXAdFC2xWfLrWi5Lobg8xJML in all the received transactions i.e. 3039435, 3039434 and 3039438. The matching unit 216 links other source address 1EoGSzK83VDHoGr9ohsqJ3Jt7mbhxoqaRv associated with the source address 1Lijr4mXiYcXAdFC2xWfLrWi5Lobg8xJML in transaction 3039434 with the user of source address 1Lijr4mXiYcXAdFC2xWfLrWi5Lobg8xJML. The matching unit 216, further searches for source address 1Lijr4mXiYcXAdFC2xWfLrWi5Lobg8xJML in the destination addresses of the received transactions 3039434 and 3039438. The source address 1Lijr4mXiYcXAdFC2xWfLrWi5Lobg8xJML is found as a destination address of the transaction 3039438. The matching unit 216 assigns matching destination address to the same user. The matching unit 216 analyses the transaction 3039438 for change address 19TvMBef3sCghwxwEfE1aRAjHj5LSWicB9 associated with the destination address 1Lijr4mXiYcXAdFC2xWfLrWi5Lobg8xJML. Further, the matching unit 216 links the change address 19TvMBef3sCghwxwEfE1aRAjHj5LSWicB9 to the user of the source address 1BCkEn6S5Hc97bzgMzLDp4A7evJWEZpKUY. In various embodiments of the present invention, the matching unit 216 generates a list of the identified users.

The data presentation unit 218 is configured to receive a list of identified users and transactional data from the matching unit 216. Further, the data presentation unit 218 retrieves one or more predetermined transactional attributes from the memory 212. The transactional attributes are selected so as to define characteristics of a user and its transaction behaviour with other users. In an exemplary embodiment of the present invention, transactional attributes may include but are not limited to total bitcoin sent, total bitcoin received, highest bitcoins sent, highest bitcoins received, number of transactions as a sender and number of transactions as a receiver.

The data presentation unit 218 further evaluates user-level statistics by using the list of identified users and extracting relevant information associated with a transactional attribute from the received transactional data. In particular, the data presentation unit 218 generates a data set representative of identified users and associated transactional behavior based on the generated transactional attributes. FIG. 3 depicts an exemplary table of the dataset generated by the data representation unit 218 using the list of identified users and associated transactional information based on the generated transactional attributes, in accordance with an exemplary embodiment of the present invention.

Further, the data presentation unit 218 processes the generated dataset by using a second set of rules to generate a datatype. The generated datatype is representative of transactional behavior of the users with other users. In an exemplary embodiment of the present invention, the datatype generated based on the second set of rules is an adjacency matrix as shown in FIG. 4. The rows and columns of the matrix represent the users and the elements of the matrix represent the number of transactions between respective users. Said datatype is further used by the data presentation unit 218 to calculate similarity index for identified users participating in one or more transactions. The term similarity index as used in the specification is evaluated based on the number of transactions between a user with another user in the network. More the number of transactions between any two users, higher is the similarity index between them.

The generated data sets and datatype are received as an input by the user grouping unit 220. The user grouping unit 220 groups the identified users with similar transactional behavior into one or more data clusters. In particular, the user grouping unit 220 applies one or more clustering techniques such as k-means clustering technique to form first level data clusters of the identified users based on the retrieved transactional attributes. Each data cluster is representative of identified users with similar transactional behaviour and thereby similar transactional history.

In an exemplary embodiment of the present invention, the user grouping unit 220 groups the identified users with similar transactional behavior into one or more first level data clusters by applying the k-means clustering technique. More particularly, the grouping unit 220 segments the users into a number of clusters based on the retrieved transactional attributes. For example: the transactional attributes in a bitcoin network may include total bitcoin sent, total bitcoin received, highest sent transaction, highest received transaction, number of sent transactions and number of received transactions. The identified users may be segmented into two or more data clusters with each cluster having its own set of transactional characteristics. For instance cluster 1 may have total bitcoin received between 100-150 USD, total bitcoin sent between 50-70 USD, no. of sent transactions 0-2 and no. of received transactions 2-5 etc.; Cluster 2 may have total bitcoin received between 1-50 USD, total bitcoin sent between 20-30 USD, no. of sent transactions 2-4 and no. of received transactions 1-2 etc. Users which have similar attributes with respect to Cluster 1 may be grouped under one data cluster, likewise users with similar attributes with respect to Cluster 2 may be grouped under another cluster. The outcome of such clustering in this exemplary embodiment would be six data clusters of the identified users based on their transactional behaviour.

The data processing unit 222 is configured to receive the generated first level data clusters, the generated data set and the generated datatype (adjacency matrix) from the user grouping unit 220. The data processing unit 222 generates one or more behavioural parameters from the generated first level data clusters. In an exemplary embodiment of the present invention, a behavioral parameter is a function based on mean and standard deviation of feature variables of each data cluster. The feature variable is a subset of relevant transactional attributes. The feature variables are selected on the basis of domain knowledge of the data i.e. transactional attributes and are used to differentiate one data cluster from another. In an exemplary embodiment of the present invention, the feature variable is a function of transaction attributes total bitcoins sent and total bitcoins received. The data processing unit 222 generates one or more behavioural parameters from the generated first level data clusters by evaluating the mean and standard deviation of feature variables (total BTC sent+total BTC Received) for each of the first level data clusters.

Further, the data processing unit 222 generates anomaly detection values based on the generated first level data clusters, datatype (adjacency matrix) and one or more behavioural parameters derived from the data clusters. In an exemplary embodiment of the present invention, the generated data clusters, data type and one or more behavioural parameters are implemented and analysed by an anomaly detection technique to generate anomaly detection values. In an embodiment of the present invention, the anomaly detection technique may include a community outlier detection method based on Hidden Markov Random Field. In operation, in community outlier detection method, the nodes representing users, are connected through links representing transactional attributes in a graph representing distributed and decentralised network.

Further, the data processing unit 222 employs the said method and uses data clusters as hidden states and the user data within the data clusters as observable states. For instance, Hidden Markov method is a probabilistic process to assign a hidden label to every node (user). In an exemplary embodiment of the present invention, in a bitcoin network, there is a specific pattern to each transaction of every user. A user generally performs a transaction of a certain range of money depending on the recipient user. Therefore, assigning a particular label to the user is dependent on last label that was assigned to the user. Since, assigning a community is an unsupervised instance, this label cannot be directly observed. Therefore, labels are defined as hidden states. These hidden states can be predicted based on observation sequence. Transaction details such as mean and standard deviation of total bitcoins sent, received and number of transactions are considered as observation sequences. Weighted combination of these features are put into observation states which is eventually used for assigning hidden states or labels. Every observation sequence may end up in different hidden states based on the probability of last state. The anomaly detection values are expressed as a function of probability of a user belonging to each of the hidden states i.e. data clusters, and is referred as posterior energy (PE) value. The PE value is evaluated using the following exemplary equation as illustrated below:

$$U_i(k) = \begin{cases} -\ln P(x_i = s_i \mid z_i = k) - \lambda \Sigma_{j \in N_i} w_{ij} \delta(k - z_j) & k \neq 0 \\ a_0 & k = 0 \end{cases}$$

In the above exemplary equation, the logarithmic component signifies the node component (i.e. user component) and the latter denotes the link component (i.e. network component) as well as neighborhood strength of the user.

The node component is representative of the probability of a user belonging to a particular data cluster and is deduced from the above equation as:

$$\ln P\left(\frac{X}{Z}\right) = -\frac{(FV - \text{Mean})^2}{2 * SD^2} - \ln(SD) - \ln\left(\sqrt{2\pi}\right)$$

In the above equation X denotes a user, Z denotes a data cluster, FV denotes feature variable of the user, mean denotes the mean of the feature variables of users of the data cluster and SD denotes the standard deviation of the feature variables of users of the data cluster.

Further, the link component is representative of the transactional behaviour of a user with other users and may be deduced from the above equation as:

$$\lambda \Sigma w(i,j) * \delta(K - z)$$

In this equation $\lambda$ is a predetermined network parameter (network hyper parameter). In an exemplary embodiment of the present invention, the value of the network parameter may be in the range of 0 to 1. The network parameter $\lambda$ value is representative of confidence in the network structure, where more weight on the network and less weight on the data represents higher value of network parameter $\lambda$ and vice versa. Further w (i, j) denotes number of times a user i transacts with user j and may be deduced from the datatype (adjacency matrix). Furthermore, K denotes the data cluster to be checked for the user; and Z is the data cluster currently assigned to the user.

In various embodiments of the present inventions the anomaly detection value is evaluated by subtracting link component from the node component. In another exemplary embodiment of the present invention, the probability of a user belonging to each of a hidden state is deduced from the equation below:

$$P\left(\frac{Z}{X}\right) = P\left(\frac{X}{Z}\right) * P(Z)$$

Where, Z denotes the data cluster and X denotes user

An exemplary embodiment for evaluating the anomaly detection value of an exemplary user 1 has been shown herein below:

TABLE 1

|  | Data clusters | FV |
| --- | --- | --- |
| User 1 | 1 | 15 |
| User 2 | 3 | 20 |
| User 3 | 1 | 10 |

Table 1 shows the first level data clusters assigned to the users by applying k- means clustering technique and the corresponding feature variable value of a user of the data cluster.

From Table 1 the mean and standard deviation of the feature variables of the users of data cluster 1 are evaluated as shown in Table 2.

TABLE 2

|  | Mean of FV | SD of FV |
| --- | --- | --- |
| Data cluster = 1 | 12 | 5 |

Further the node component is evaluated by implementing the deduced values into the equation below:

$$\ln P\left(\frac{X}{Z}\right) = -\frac{(FV - \text{Mean})^2}{2*SD^2} - \ln(SD) - \ln\left(\sqrt{2\pi}\right)$$

Node Component=−[square(15−12)/2*square(5)]−ln(5)−ln(sqrt(2*pi))

Table 3 shows the adjacency matrix generated by the data processing unit 222 by applying second set of rules on the generated dataset (FIG. 3).

TABLE 3

|  | User 1 | User 2 | User 3 |
| --- | --- | --- | --- |
| User 1 |  | 2 | 7 |
| User 2 | 2 |  | 11 |
| User 3 | 7 | 11 |  |

As described above the link component is evaluated using the below equation:

λΣw(i,j)*δ(K−z)

W(1,2)=2 from the adjacency matrix,
W(1,3)=7 from the adjacency matrix,
Further the value of function is δ(K−z) is 1 if K and Z are different and 0 if both are equal. In this function K denotes the data cluster to be checked and Z denotes the data cluster currently assigned to the user.

The link component=λ*[w(1,2)*1+w(1,3)*0].

Anomaly Detection value of user 1 for data cluster 1 (Posterior Energy)=Node Component−Link Component.

The anomaly detection values obtained, as described above, would be expressed in terms of a posterior energy value for every user (as shown in FIG. 5).

The data processing unit 222, classifies the users classified into one or more second level data clusters based on the generated anomaly detection values based on a third set of rules. The second level data clusters are representative of data associated with users having similar transactional behavior. In an exemplary embodiment of the present invention, based on a third set of rules, higher is the anomaly detection value of a user for a data cluster, lesser is the probability of the user belonging to that data cluster. The cluster for which the user has the least anomaly detection value gets assigned to the user. An exemplary table depicting an example of classification of users into data cluster based on the anomaly detection values (posterior energy values), in accordance with an exemplary embodiment of the present invention is shown in FIG. 6.

The data processing unit 222, further derives one or more behavioural parameters for second level data clusters in a like manner as explained above with reference to the determination of behavioural parameters for first level data clusters. Further, the data processing unit 222 derives anomaly detection values corresponding to second level data clusters based on the generated second level data clusters, the datatype (adjacency matrix) generated using the dataset and one or more behavioural parameters derived from the second level data clusters. The data processing unit 222 classifies the users into new data clusters using new anomaly detection values based on a third set of rules.

Figure 7:
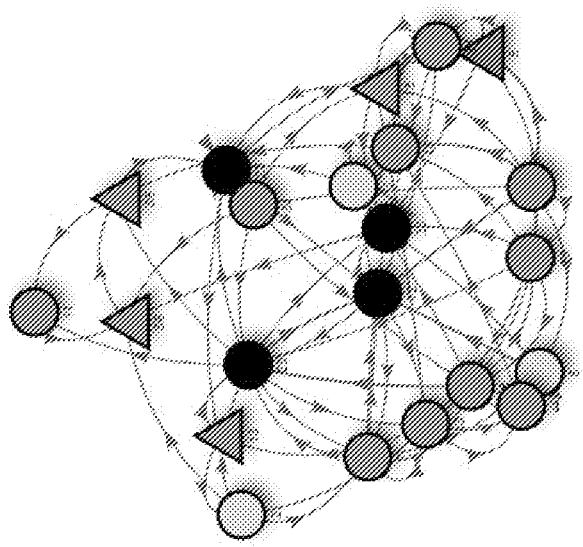
FIG. 7 is an exemplary illustration of graphical outputs of the anomaly detection technique, in accordance with an exemplary embodiment of the present invention.
Figure 7:
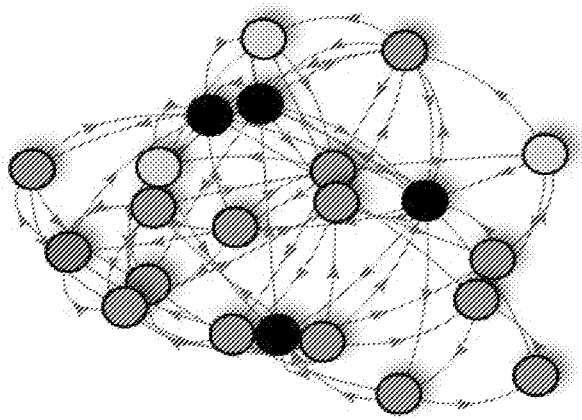

The data processing unit 222 is further configured to perform a check after the classification of users into new data clusters to determine if the classification of the users remains the same. For instance the data processing unit 222, performs a check to determine if the classification of users into new data clusters is same as the classification of users into second level data clusters. If it is determined that the classification remains the same, then the classification is identified as the optimum classification. The users are identified from the optimum classification and categorised as anomalous users. In an exemplary embodiment of the present invention, the users with high anomaly detection value (posterior energy value) amongst users of all the data clusters are categorised as anomalous users. An exemplary illustration of graphical outputs of the anomaly detection technique, in accordance with an exemplary embodiment of the present invention is shown in FIG. 7. Further, if is determined that there is a change in the classification then, the data processing unit 222 continues further classification of users based on the manner as explained earlier into further new data clusters using associated new anomaly detection values, until optimum classification is achieved.

Figure 8:
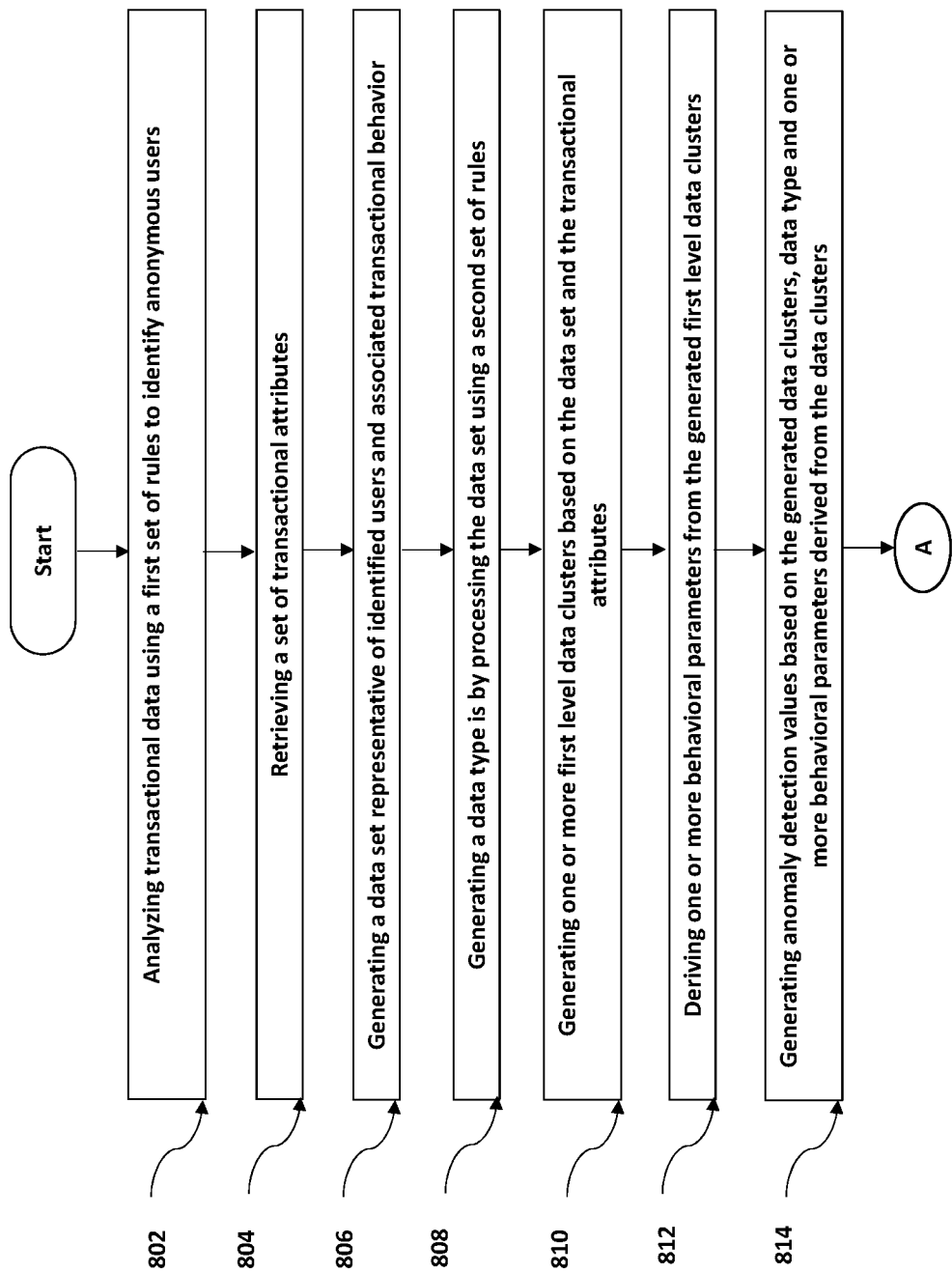
FIG. 8 is a flowchart illustrating a method for detecting anomalous activities in a distributed and decentralized network, in accordance with various embodiments of the present invention.
Figure 8:
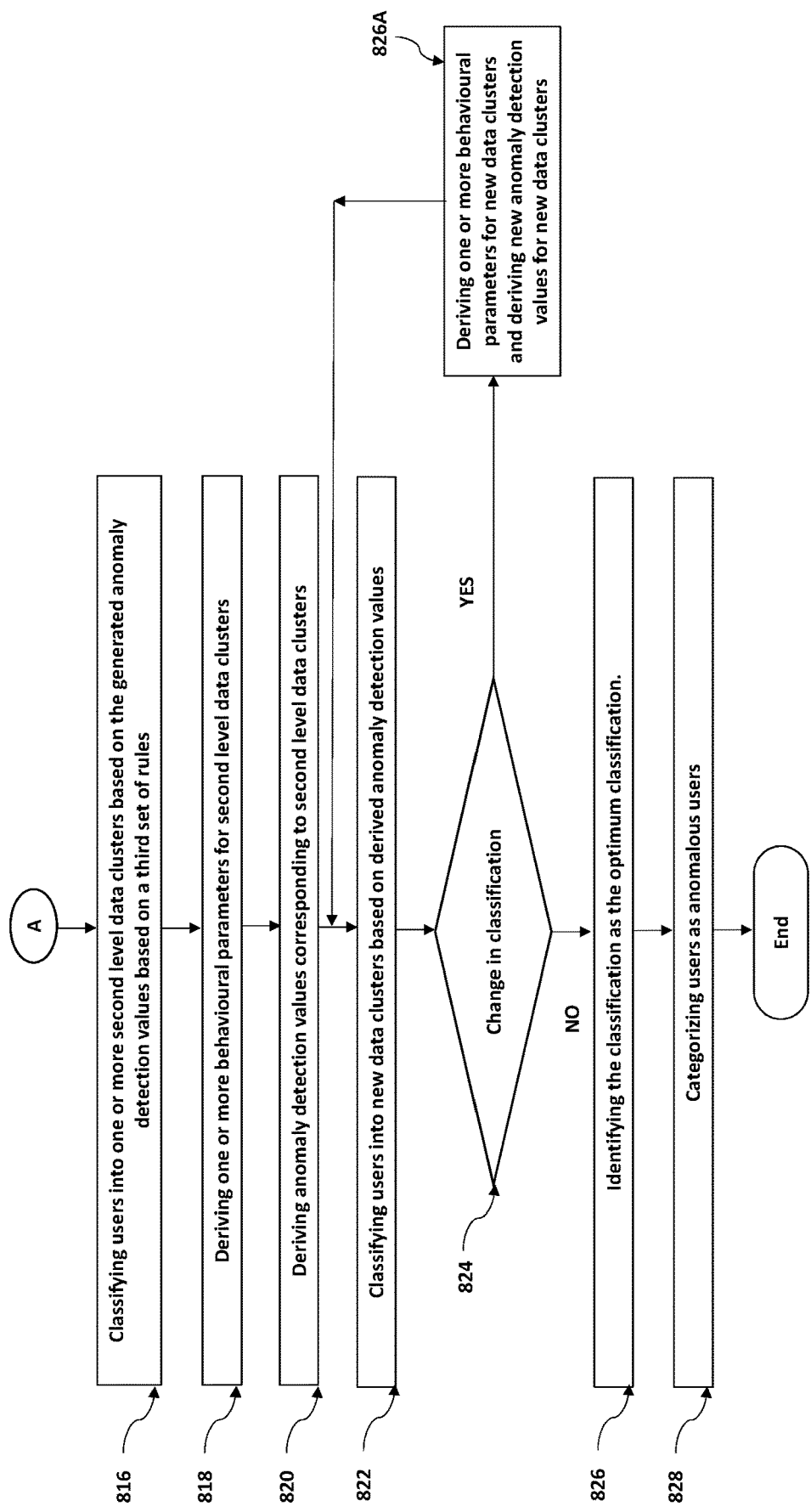

FIG. 8 is a flowchart illustrating a method for detecting anomalous activities in a distributed and decentralized network, in accordance with various embodiments of the present invention.

At step 802, transactional data is analysed to identify anonymous users transacting in a distributed and decentralised network using a first set of rules. In an embodiment of the present invention, transactional data associated with one or more transactions between one or more users is retrieved. Said transactional data includes, but is not limited to, transaction details such as source addresses, destination addresses, transaction time stamps, address data, transaction input value, transaction output value, transaction fee etc. In an exemplary embodiment of the present invention, the transactional data may be associated with transactions carried out in a bitcoin network. Said transactional data may include details of transactions between multiple source and destination addresses, number of bitcoins sent from one address to another, number of bitcoins received by a destination address, time stamps of corresponding transactions, bitcoin balance of an address, block height etc.

In an exemplary embodiment of the present invention, based on an analysis of the transactional data, anonymous users are identified by linking multiple source and destination addresses that are unique to a particular user using a first set of rules. For example, unique addresses associated with anonymous users retrieved from transaction database 204 (FIG. 2) are analysed. Thereafter, each unique source address associated with a single transaction is linked to a user. Further, each unique source address in all the received transactions is searched and source addresses that are associated with the unique source address in one or more transactions are linked with the user of respective source address. Furthermore, each unique source address in the destination addresses of the received transactions is searched. In this case, received transactions for change addresses associated with destination addresses that are same as unique source addresses are analysed. The change address is linked to the user of the respective source addresses. In an exemplary embodiment of the present invention, the change address is representative of a new address or any previously generated in a transaction in order to receive remaining data from a source address which is different from the destination address. In various embodiments of the present invention, a list of identified users is generated.

At step 804, one or more predetermined transactional attributes are retrieved. In an embodiment of the present invention, transactional attributes are selected so as to define characteristics of a user and its transactional behaviour with other users. The transactional attributes may include but are not limited to total bitcoin sent, total bitcoin received, highest bitcoins sent, highest bitcoins received, number of transactions as a sender and number of transactions as a receiver.

At step 806, a data set representative of identified users and associated transactional behavior is generated based on the transactional attributes. In an embodiment of the present invention, the data set is representative of user-level statistics of the identified users (shown in FIG. 3).

At step 808, a datatype is generated by processing the data set using a second set of rules. In an embodiment of the present invention, the generated datatype is representative of transactional behavior of the users with other users. In an exemplary embodiment of the present invention, the datatype is an adjacency matrix as shown in FIG. 4. The rows and columns of the matrix represent the users and the elements of the matrix represent the number of transactions between respective users. Said datatype is used to calculate the similarity index for identified users participating in one or more transactions. The term similarity index as used in the specification is evaluated based on the number of transactions between a user with another user in the network. More the number of transactions between any two users, higher is the similarity index between them.

At step 810, one or more first level data clusters are generated based on the data set and the transactional attributes. In an embodiment of the present invention, the identified users with similar transactional behavior are grouped into one or more clusters applying one or more clustering techniques. A data cluster is representative of data associated with users having similar transactional behavior. In an exemplary embodiment of the present invention, the clustering technique is a k-means clustering technique. The users are segmented into a number of clusters based on the retrieved transactional attributes. For example: the transactional attributes in a bitcoin network may include total bitcoin sent, total bitcoin received, highest sent transaction, highest received transaction, number of sent transactions and number of received transactions. The identified users may be segmented into two or more data clusters with each cluster having its own set of transactional characteristics. For instance cluster 1 may have total bitcoin received between 100-150 USD, total bitcoin sent between 50-70 USD, no. of sent transactions 0-2 and no. of received transactions 2-5 etc.; Cluster 2 may have total bitcoin received between 1-50 USD, total bitcoin sent between 20-30 USD, no. of sent transactions 2-4 and no. of received transactions 1-2 etc. Users which have similar transactional attributes with respect to Cluster 1 may be grouped under one data cluster, likewise users with similar attributes with respect to Cluster 2 may be grouped under another cluster. The outcome of such clustering in this exemplary embodiment would be six data clusters of the identified users based on their transactional behaviour.

At step 812, one or more behavioral parameters are derived from the generated first level data clusters. In an exemplary embodiment of the present invention, a behavioral parameter is a function based on mean and standard deviation of feature variables of each data cluster. The feature variable is a subset of relevant transactional attributes. The feature variables are selected on the basis of domain knowledge of the data i.e. transactional attributes and are used to differentiate one data cluster from another. In an exemplary embodiment of the present invention, the feature variable is a function of transaction attributes i.e. total bitcoins sent and total bitcoins received. The data processing unit 222 generates one or more behavioral parameters from the generated first level data clusters by evaluating the mean and standard deviation of feature variables (total BTC sent+total BTC Received) for each of the first level data clusters.

At step 814, anomaly detection values are generated based on the generated first level data clusters, the datatype and one or more behavioural parameters derived from the data clusters. In an exemplary embodiment of the present invention, 9hkl. In an exemplary embodiment of the present invention, the anomaly detection technique is community outlier detection method based on Hidden Markov Random Field. In this method data clusters are used as hidden states and the user data within the data clusters are used as observable states.

The anomaly detection values are expressed as a function of probability of a user belonging to each of the hidden states i.e. data clusters, and is referred as posterior energy (PE) value. The PE value is evaluated using the following exemplary equation as illustrated below:

$$U_i(k) = \begin{cases} -\ln P(x_i = s_i \mid z_i = k) - \lambda \Sigma_{j \in N_i} w_{ij} \delta(k - z_j) & k \neq 0 \\ a_0 & k = 0 \end{cases}$$

In the above exemplary equation, the logarithmic component signifies the node component (i.e. user component) and the latter denotes the link component (i.e. network component) as well as neighborhood strength of the user.

The node component is representative of the probability of a user belonging to a particular data cluster and is deduced from the above equation as:

$$\ln P\left(\frac{X}{Z}\right) = -\frac{(FV - \text{Mean})^2}{2 * SD^2} - \ln(SD) - \ln\left(\sqrt{2\pi}\right)$$

In the above equation X denotes a user, Z denotes a data cluster, FV denotes feature variable of the user, mean denotes the mean of the feature variables of users of the data cluster and SD denotes the standard deviation of the feature variables of users of the data cluster.

Further, the link component is representative of the transactional behaviour of a user with other users and may be deduced from the above equation as:

$$\lambda \Sigma w(i,j) * \delta(K-z)$$

In this equation $\lambda$ is a predetermined network parameter (network hyper parameter). In an exemplary embodiment of the present invention, the value of the network parameter may be in the range of 0 to 1. The network parameter $\lambda$ value is representative of confidence in the network structure, where more weight on the network and less weight on the data represents higher value of network parameter $\lambda$ and vice versa. Further w (i, j) denotes number of times a user i transacts with user j and may be deduced from the datatype (adjacency matrix). Furthermore, K denotes the data cluster to be checked for the user; and Z is the data cluster currently assigned to the user.

In various embodiments of the present inventions the anomaly detection value is evaluated by subtracting link component from the node component. In another exemplary embodiment of the present invention, the probability of a user belonging to each of a hidden state is deduced from the equation below:

$$P\left(\frac{Z}{X}\right) = P\left(\frac{X}{Z}\right) * P(Z)$$

Where, Z denotes a data cluster and X denotes a user

The anomaly detection values obtained, as described above, would be expressed in terms of a posterior energy value for every user (as shown in FIG. 5).

At step 816, users are classified into one or more second level data clusters based on the generated anomaly detection values using a third set of rules. The second level data clusters are representative of data associated with users having similar transactional behavior. In an exemplary embodiment of the present invention, based on a third set of rules, it determined that higher is the anomaly detection value of a user for a data cluster, lesser is the probability of the user belonging to that data cluster. The cluster for which the user has the least anomaly detection value gets assigned to the user. An exemplary table depicting an example of classification of users into data cluster based on the anomaly detection values (posterior energy values), in accordance with an exemplary embodiment of the present invention is shown in FIG. 6.

At step 818, one or more behavioural parameters are derived from the second level data clusters in a like manner as at step 812. At step 820, anomaly detection values corresponding to second level data clusters are derived in a like manner as at step 814.

At step 822, step 816 is repeated to classify users into new data clusters based on anomaly detection values generated at step 820.

At step 824, a check is performed to determine if at step 822, the classification of users into new data clusters remain same as the classification of users into second level data clusters at step 816.

At step 826, if it is determined that the classification at step 822 remains the same as the classification at step 816, the classification is identified as the optimum classification. At step 826A, if it is determined that the classification of users has changed, the one or more behavioural parameters are derived from new data clusters in the like manner as step 812. Further, new anomaly detection values corresponding to new data clusters are derived in the like manner as at step 814. Steps 822 and 824 are repeated until optimum classification is achieved.

At step 828, users are identified from the optimum classification and categorised as anomalous users. In an exemplary embodiment of the present invention, the users with high anomaly detection value (posterior energy value) amongst all the data clusters are categorised as anomalous users. [To the inventors: Please exemplify the highlighted text with the help of PE values of FIG. 6 in light of the present invention]

Figure 9:
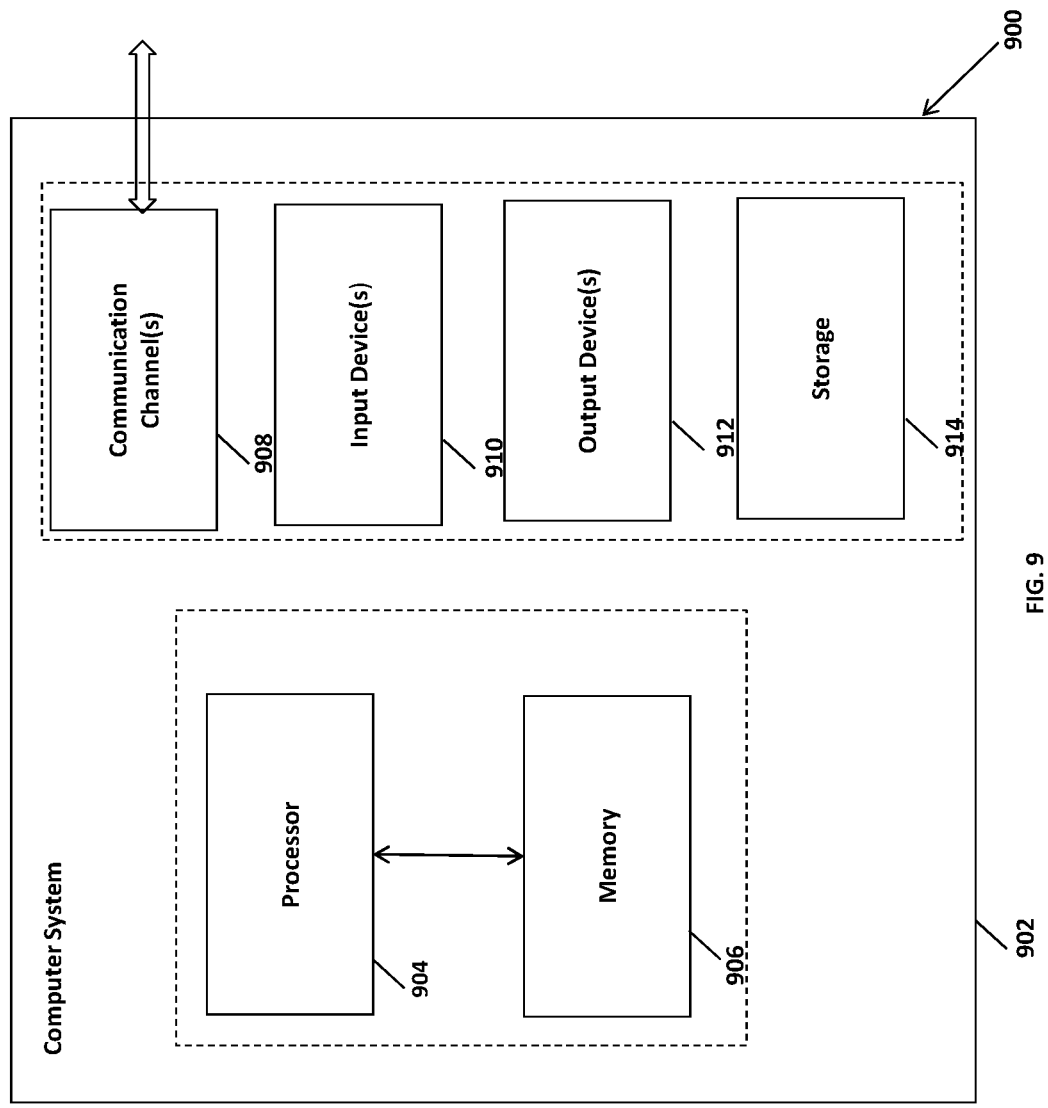
FIG. 9 illustrates an exemplary computer system in which various embodiments of the present invention may be implemented.

FIG. 9 illustrates an exemplary computer system in which various embodiments of the present invention may be implemented. The computer system 902 comprises a processor 904 and a memory 906. The processor 904 executes program instructions and is a real processor. The computer system 902 is not intended to suggest any limitation as to scope of use or functionality of described embodiments. For example, the computer system 902 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 906 may store software for implementing various embodiments of the present invention. The computer system 902 may have additional components. For example, the computer system 902 includes one or more communication channels 908, one or more input devices 910, one or more output devices 912, and storage 914. An interconnection mechanism (not shown) such as a bus, controller, or network, interconnects the components of the computer system 902. In various embodiments of the present invention, operating system software (not shown) provides an operating environment for various softwares executing in the computer system 902, and manages different functionalities of the components of the computer system 902.

The communication channel(s) 908 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 910 may include, but not limited to, a keyboard, mouse, pen, joystick, trackball, a voice device, a scanning device, touch screen or any another device that is capable of providing input to the computer system 902. In an embodiment of the present invention, the input device(s) 910 may be a sound card or similar device that accepts audio input in analog or digital form. The output device(s) 912 may include, but not limited to, a user interface on CRT or LCD, printer, speaker, CD/DVD writer, or any other device that provides output from the computer system 302.

The storage 914 may include, but not limited to, magnetic disks, magnetic tapes, CD-ROMs, CD-RWs, DVDs, flash drives or any other medium which can be used to store information and can be accessed by the computer system 902. In various embodiments of the present invention, the storage 914 contains program instructions for implementing the described embodiments.

The present invention may suitably be embodied as a computer program product for use with the computer system 902. The method described herein is typically implemented as a computer program product, comprising a set of program instructions which is executed by the computer system 902 or any other similar device. The set of program instructions may be a series of computer readable codes stored on a tangible medium, such as a computer readable storage medium (storage 914), for example, diskette, CD-ROM, ROM, flash drives or hard disk, or transmittable to the computer system 902, via a modem or other interface device, over either a tangible medium, including but not limited to optical or analogue communications channel(s) 908. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

We claim:

1. A method for detecting anomalous activities in a distributed and decentralized network, performed by an anomaly detection engine interfacing with one or more transaction databases and one or more terminal devices, the anomaly detection engine executing instructions stored in a memory via a processor, said method comprising:

generating, by the anomaly detection engine, a data set representative of identified users and associated transactional behavior, wherein users are identified from anonymous users transacting in the distributed and decentralized network using a first set of rules;

generating, by the anomaly detection engine, a datatype by processing the data set using a second set of rules, wherein the datatype is representative of transactional behavior of the users with other users;

generating, by the anomaly detection engine, one or more first level data clusters based on the data set and one or more transactional attributes by employing one or more clustering techniques, wherein each data cluster is representative of data associated with users having similar transactional behaviour;

generating, by the anomaly detection engine, anomaly detection values based on the first level data clusters, the datatype and one or more behavioral parameters derived from the first level data clusters by employing an anomaly detection technique;

classifying users, by the anomaly detection engine, into one or more second level data clusters based on the generated anomaly detection values using a third set of rules, wherein the second level data clusters are representative of data associated with users having similar transactional behavior;

classifying users, by the anomaly detection engine, into one or more new data clusters based on the generated anomaly detection values using a third set of rules, wherein the new data clusters are representative of data associated with users having similar transactional behavior;

determining, by the anomaly detection engine, if the classification of users into the new data clusters is same as the classification of users into the second level data clusters, wherein the classification of users is identified as optimum classification if the classification remains the same; and identifying one or more users with high anomaly detection value from the users classified in the new data cluster classification determined as optimum classification, wherein the one or more users with high anomaly detection values are identified as anomalous users.

2. The method as claimed in claim 1, further comprising deriving one or more behavioral parameters from the generated new data clusters when classification of users is determined to have changed; and generating anomaly detection values by employing the anomaly detection technique based on the one or more behavioral parameters derived from said data clusters, generated new level data clusters, and the datatype are generated.

3. The method as claimed in claim 2, wherein users are classified into one or more new data clusters based on the generated anomaly detection values using a third set of rules until optimum classification is achieved.

4. The method as claimed in claim 1, wherein the step of generating the data set representative of identified users and associated transactional behavior comprises:

analyzing, by the anomaly detection engine, transactional data retrieved from the transaction database to identify anonymous users using the first set of rules, wherein the transactional data is associated with one or more transactions between one or more users; and retrieving, by the anomaly detection engine, predetermined transactional attributes, wherein the transactional attributes are selected to define characteristics of a user and associated transactional behavior with other users.

5. The method as claimed in claim 1, wherein the step of identifying anonymous users transacting in the distributed and decentralized network using a first set of rules, comprises:

linking each unique source address associated with a single transaction to a user;

searching each unique source address in all the received transactions and linking source addresses that are associated with the unique source address in one or more transactions with the user of respective source address;

searching each unique source address in the destination addresses of the received transactions and analyzing received transactions for change addresses associated with destination addresses that are same as unique source addresses, wherein the change address is representative of a new address or any previously used address generated in a transaction in order to receive remaining data from a source address which is different from the destination address; and linking the change address to the user of the respective source addresses, and generating a list of identified users.

6. The method as claimed in claim 1, wherein the second set of rules comprises generating an adjacency matrix, wherein the rows and columns of the matrix represent the users and the elements of the matrix represent the number of transactions between respective users.

7. The method as claimed in claim 1, wherein the step of generating anomaly detection values for users of first level data clusters comprises:

deriving one or more behavioural parameters from the first level data clusters, wherein the behavioural parameter is a function based on mean and standard deviation of feature variables of each first level data cluster, further wherein the feature variable is a subset of transactional attributes selectable on the basis of domain knowledge of the transactional attributes to differentiate one data cluster from another;

generating a node component and a link component for each user by employing the anomaly detection technique on the first level data clusters, the datatype and one or more behavioral parameters derived from the first level data clusters; and evaluating the anomaly detection value for each user based on the node component and the link component.

8. The method as claimed in claim 1, wherein the step of generating anomaly detection values for users of second level data clusters comprises:

deriving one or more behavioural parameters from the second level data clusters, wherein the behavioural parameter is a function based on mean and standard deviation of feature variables of each second level data cluster, further wherein the feature variable is a subset of transactional attributes selectable on the basis of domain knowledge of the transactional attributes to differentiate one data cluster from another;

generating a node component and a link component for each user by employing the anomaly detection technique on the second level data clusters, the datatype and one or more behavioral parameters derived from the second level data clusters; and evaluating the anomaly detection value for each user based on the node component and the link component.

9. The method as claimed in claim 1, wherein the step of classifying users, into one or more data clusters based on the generated anomaly detection values using a third set of rules comprises assigning the data cluster to a user for which the user has the least anomaly detection value.

10. A system for detecting anomalous activities in a distributed and decentralized network, interfacing with one or more transaction databases and one or more terminal devices, the system comprising:

a memory storing program instructions; a processor configured to execute program instructions stored in the memory; and an anomaly detection engine in communication with the processor and configured to:

generate a data set representative of identified users and associated transactional behavior, wherein users are identified from anonymous users transacting in the distributed and decentralized network using a first set of rules;

generate a datatype by processing the data set using a second set of rules, wherein the datatype is representative of transactional behavior of the users with other users;

generate one or more first level data clusters based on the data set and one or more transactional attributes by employing one or more clustering techniques, wherein each data cluster is representative of data associated with users having similar transactional behaviour;

generate anomaly detection values based on the first level data clusters, the datatype and one or more behavioral parameters derived from the first level data clusters by employing an anomaly detection technique;

classify users into one or more second level data clusters based on the generated anomaly detection values using a third set of rules, wherein the second level data clusters are representative of data associated with users having similar transactional behavior;

classify users into one or more new data clusters based on the generated anomaly detection values using a third set of rules, wherein the new data clusters are representative of data associated with users having similar transactional behavior;

determine if the classification of users into the new data clusters is same as the classification of users into the second level data clusters, wherein the classification of users is identified as optimum classification if the classification remains the same; and identify one or more users with high anomaly detection value from the users classified in the new data cluster classification determined as optimum classification, wherein the one or more users with high anomaly detection values are identified as anomalous users.

11. The system as claimed in claim 10, further configured to derive one or more behavioral parameters from the generated new data clusters when classification of users is determined to have changed; and generates anomaly detection values by employing the anomaly detection technique based on the one or more behavioral parameters derived from said data clusters, generated new level data clusters, and the datatype are generated.

12. The system as claimed in claim 11, wherein users are classified into one or more new data clusters based on the generated anomaly detection values using a third set of rules until optimum classification is achieved.

13. The system as claimed in claim 10, wherein the anomaly detection engine comprises an interfacing unit in communication with the processor and said interfacing unit configured to interact with the transaction database and retrieve transactional data associated with one or more transactions from the transaction database, wherein the transactional data include information pertaining to one or more previously occurred transactions between one or more users.

14. The system as claimed in claim 10, wherein the anomaly detection engine comprises a matching unit in communication with the processor, said matching unit configured to analyse the transactional data retrieved from the transaction database to identify anonymous users transacting in the distributed and decentralized network by applying a first set of rules, wherein the first set of rules comprises:

linking each unique source address associated with a single transaction to a user;

searching each unique source address in all the received transactions and linking source addresses that are associated with the unique source address in one or more transactions with the user of respective source address;

searching each unique source address in the destination addresses of the received transactions and analyzing received transactions for change addresses associated with destination addresses that are same as unique source addresses, wherein the change address is representative of a new address or any previously used address generated in a transaction in order to receive remaining data from a source address which is different from the destination address; and linking the change address to the user of the respective source addresses, and generating a list of identified users.

15. The system as claimed in claim 10, wherein the anomaly detection engine comprises a data presentation unit in communication with the processor, said data presentation unit configured to retrieve one or more transactional attributes from the memory, wherein the transactional attributes are selected to define characteristics of a user and associated transactional behaviour with other users;

generate a data set representative of identified users and associated transactional behavior based on the generated transactional attributes; and generate a datatype by processing the generated dataset by using a second set of rules, wherein the second set of rules comprises generating an adjacency matrix, wherein the rows and columns of the matrix represent the users and the elements of the matrix represent the number of transactions between respective users.

16. The system as claimed in claim 10, wherein the anomaly detection engine comprises a grouping unit in communication with the processor, said grouping unit configured to group the identified users with similar transactional behavior into one or more first level data clusters by applying one or more clustering techniques such as k-means clustering technique.

17. The system as claimed in claim 10, wherein the anomaly detection engine comprises a data processing unit in communication with the processor, said data processing unit configured to:

generate one or more behavioural parameters from the data clusters, wherein the behavioral parameter is a function based on mean and standard deviation of feature variables of each data cluster, wherein further the feature variable is a subset of transactional attributes selectable on the basis of domain knowledge of the transactional attributes to differentiate one data cluster from another;

generate anomaly detection values based on the generated data clusters, one or more behavioural parameters derived from the data clusters and the datatype by employing an anomaly detection technique;

classify users into one or more new data clusters based on the generated anomaly detection values using a third set of rules, wherein third set of rules comprises assigning the data cluster to a user for which the user has the least anomaly detection value;

determine if the classification of users into new data clusters is the optimum classification, wherein the classification of users is identified as optimum classification if the classification remains the same; and identify one or more users with high anomaly detection value from the users classified in the new data cluster classification determined as optimum classification, wherein the one or more users with high anomaly detection values are identified as anomalous users.

18. A computer program product comprising:

a non-transitory computer-readable medium having computer-readable program code stored thereon, the computer-readable program code comprising instructions that, when executed by a processor, cause the processor to:

generate a data set representative of identified users and associated transactional behavior, wherein users are identified from anonymous users transacting in the distributed and decentralized network using a first set of rules;

generate a datatype by processing the data set using a second set of rules, wherein the datatype is representative of transactional behavior of the users with other users;

generate one or more first level data clusters based on the data set and one or more transactional attributes by employing one or more clustering techniques, wherein each data cluster is representative of data associated with users having similar transactional behaviour;

generate anomaly detection values based on the first level data clusters, the datatype and one or more behavioral parameters derived from the first level data clusters by employing an anomaly detection technique;

classify users into one or more second level data clusters based on the generated anomaly detection values using a third set of rules, wherein the second level data clusters are representative of data associated with users having similar transactional behavior;

classify users into one or more new data clusters based on the generated anomaly detection values using a third set of rules, wherein the new data clusters are representative of data associated with users having similar transactional behavior;

determine if the classification of users into the new data clusters is same as the classification of users into the second level data clusters, wherein the classification of users is identified as optimum classification if the classification remains the same; and identify one or more users with high anomaly detection value from the users classified in the new data cluster classification determined as optimum classification, wherein the one or more users with high anomaly detection values are identified as anomalous users.

19. The computer program product as claimed in claim 18, further causes the processor to derive one or more behavioral parameters from the generated new data clusters when classification of users is determined to have changed; and generates anomaly detection values by employing the anomaly detection technique based on the one or more behavioral parameters derived from said data clusters, generated new level data clusters, and the datatype are generated.

20. The computer program product as claimed in claim 19, wherein users are classified into one or more new data clusters based on the generated anomaly detection values using a third set of rules until optimum classification is achieved.

\* \* \* \* \*